July 17, 1962 F. P. MASON 3,045,125

APPARATUS FOR READING DATA FROM A STORAGE MEDIUM

Filed Aug. 11, 1960 2 Sheets-Sheet 1

Inventor
F. P. MASON
By [signature]
ATTORNEY

APPARATUS FOR READING DATA FROM A STORAGE MEDIUM

Filed Aug. 11, 1960 2 Sheets-Sheet 2

*Inventor*
F.P.MASON
*By* [signature]
ATTORNEY 3,045,125
Patented July 17, 1962

3,045,125

APPARATUS FOR READING DATA FROM A STORAGE MEDIUM

Frederick Percival Mason, Croydon, England, assignor to Creed & Company Limited, Croydon, England, a British company Filed Aug. 11, 1960, Ser. No. 49,051
Claims priority, application Great Britain Sept. 1, 1959
10 Claims. (Cl. 250—238)

Figure 1:
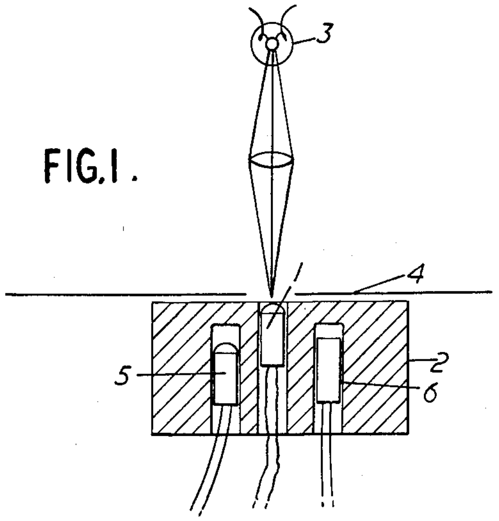

This invention relates to improvements in or relating to apparatus for reading data from a storage medium using a photo-electric method of reading.

Some types of data storage medium are used for carrying code signals in the form of combinations of perforations and they have the disadvantage from the point of view of photo-electric reading that they are translucent. When the storage medium is in the form of a tape, a type of parchment is usually used which suffers from this disadvantage. It is found that the ratio between the intensity of a light beam passing through a hole in a parchment tape to the intensity of the same beam after striking the tape where there is no hole may be only 4:1. If an unstabilised exciter lamp power source is used, normal variations in power supply voltages and temperatures cause the effective ratio of the corresponding signals emitted by a reading photo-cell to be diminished to 2:1 or less, and reliable working of a tape reader cannot be obtained at a reasonable equipment cost with such a low ratio.

In Belgian Patent No. 594,624 issued March 1, 1961, it was proposed to increase the ratio of the intensity of a beam of light reaching a photocell by causing the beam to pass through a perforation in a tape more than once in its passage between the light source and the photocell.

However, in tape readers using semiconductor photocells, further difficulties arise owing to the fact that these devices are considerably disturbed by change of temperature and are most sensitive to radiation in the infra-red frequency band.

The disturbance caused by the change of temperature is of the same kind as that caused by the influx of light. The extent of the disturbance, due to the combined effects of change of ambient air temperature radiation from parts of the apparatus which have been heated as a result of power dissipation within the apparatus, may overwhelm the response to light.

It is one of the objects of the present invention therefore to provide apparatus for reading data from a storage medium, which has a substantial immunity from the effects of change of ambient temperature.

According to the present invention therefore there is provided:

Apparatus for reading data from a storage medium comprising a light source, a photosensitive device for generating electric current signals in response to light received from said source by way of said storage medium, signal responsive means electrically connected to said photosensitive device for receiving outputs from said photosensitive device in accordance with said electric current signals generated thereby, and temperature sensitive means thermally coupled to said photosensitive device and electrically connected to said signal responsive means in such a manner that the effect of variations in the temperature of said photosensitive device on the said outputs therefrom to said signal responsive means is compensated for.

Figure 2:
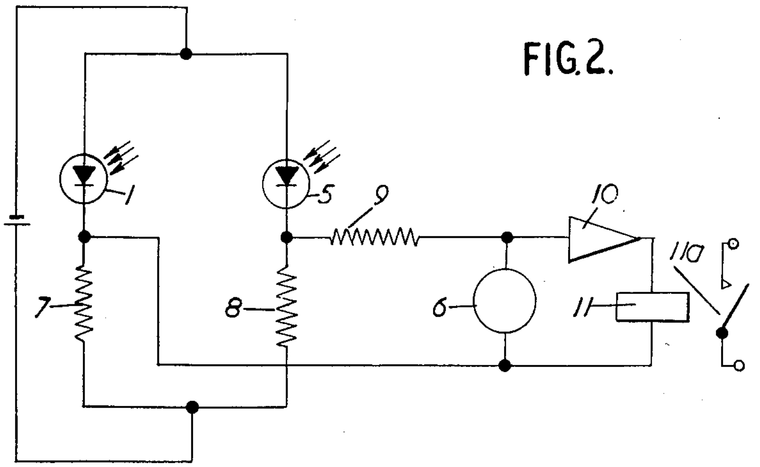

The invention will be better understood from the following description read with reference to the accompanying drawings in which:

FIGS. 1 and 2 show respectively an arrangement of one embodiment of the present invention in which a photosensitive device, such as a semiconductor photocell, is located in a tight thermal coupling with a first thermosensitive device and with a second thermo-sensitive device; and a suitable circuit arrangement in which the photocell and the two thermo-sensitive devices may be connected to obtain an output of improved stability.

Figure 3:
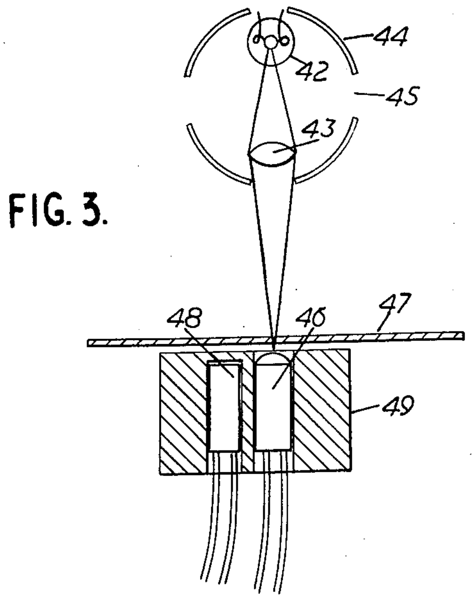
Figure 4:
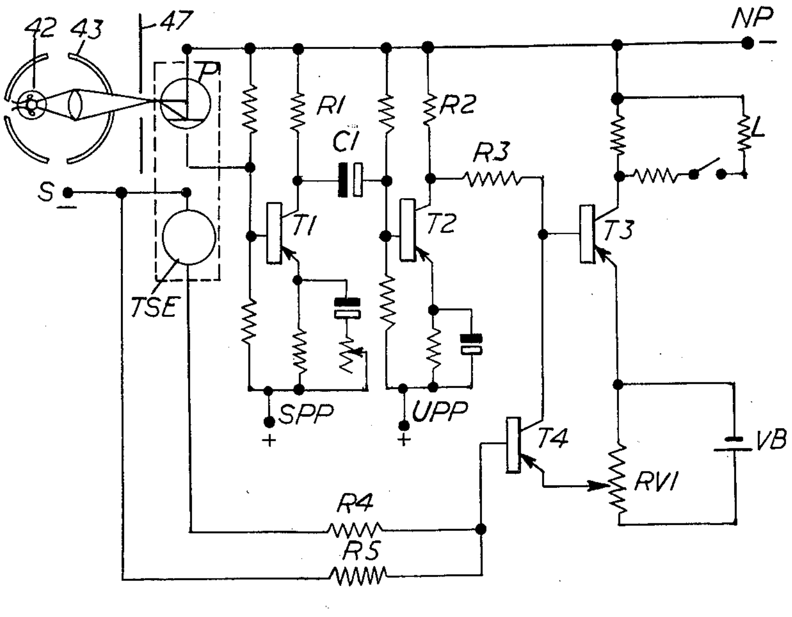

FIGS. 3 and 4 show respectively an arrangement of a further embodiment of the present invention in which a photosensitive device, such as a semiconductor photocell, is located in tight thermal coupling with a single thermo-sensitive device; and a suitable circuit arrangement in which the photocell and the thermo-sensitive device may be connected to obtain an output of improved stability.

It will readily be understood that in the event of the data storage medium being a perforated tape that the light from the sources of the two embodiments to be described herein may be received by the respective photocells thereof along a sequence of paths in a manner described with respect to the embodiments described in the above-mentioned Belgian patent.

However in the event of the data storage medium being a code printed card, tape or form (in which the data is appended thereon in the form of, for example, black dots on a white background) it will be necessary to dispose the photocell and the light source in such positions with respect to each other that light is received by the former from the latter through reflection thereof from the data storage medium or from data marked or printed thereon. For the purpose of example, in the embodiments now to be described, it should be considered that the data storage medium is a perforated tape and that the data is in the form of perforations in the tape. Thus the expression "light received by way of said storage medium" includes light received through perforations and light reflected from the medium.

In the embodiments the term thermo-sensitive element is used to define electrical devices the characteristics of which are such that when an electric potential is applied thereto, changes in temperature of the devices manifest themselves as changes in the resistance thereof. The devices include thermally sensitive resistors which manifest a negative temperature coefficient of resistance, and semi-conductor junction devices such as, for example, photocells and diodes.

Referring now to FIG. 1, which shows one embodiment of the present invention, a photosensitive device, such as a semi-conductor photocell 1, is mounted in a metallic block 2 in such a way that light may fall upon it from a light source 3 either through a perforation in data storage medium, for example, a tape 4 or through the tape 4 itself. The metallic block 2 is made of a metal of high thermal conductivity such as, for example, copper: brass is also found to be a satisfactory material. Also mounted in the block 2 is a first thermo-sensitive device 5 and a second thermo-sensitive device 6. Both the first thermo-sensitive device 5 and the second thermo-sensitive device 6 are completely housed in the block 2, so that no light falls on either of them.

In this particular embodiment, and by way of example, the first and second thermo-sensitive elements may be both semi-conductor photocells, or other forms of semi-conductor junction devices, or thermally sensitive resistors, these thermo-sensitive elements constituting a temperature sensitive means.

From FIG. 1 it will be seen that in this embodiment, photocell 1 and the elements 5 and 6 are arranged to be in good thermal contact with the block 2, and the distances between these various components within the block are such that they are tightly coupled thermally to one another i.e. as the temperature of one (in particular the photocell 1) varies, so the temperatures of the others will vary with it. It is found that tight thermal coupling may be obtained if the components are, for example, separated in the block by distances approximately equal to their own diameters (i.e. about .080 inch) in a copper block, and about half their own diameters in a brass block.

In FIG. 2 there is shown a circuit in which the components 1, 5, and 6 may be connected. The semiconductor photocell 1 and thermo-sensitive element 5 with resistors 7 and 8 form a Wheatstone bridge which is balanced when there is no perforation in the tape and light is falling on the semiconductor photocell 1 after attenuation by the tape. A portion of the unbalance electric current signal in the bridge resulting from light falling on the semi-conductor photocell 1 is taken via a potential divider consisting of a resistor 9 and the thermo-sensitive element 6 to an amplifier 10 constituting a signal responsive means and which controls a suitable two condition device, indicated in FIG. 2 by a relay 11 and its contact 11*a*.

When the temperature of the apparatus varies, the photocell 1 and thermo-sensitive element 5 warm up or cool down together, and, in the event of there being no perforation in the tape, the Wheatstone bridge will remain balanced and there will be no output through the potential divider consisting of resistor 9 and the thermo-sensitive element 6. As the temperature of the photo-cell 1 and thermo-sensitive element 5 varies, however, the unbalance electric current signal output from the bridge when there is a perforation in the tape will vary. The purpose of the thermo-sensitive element 6 is to compensate for this variation in temperature and to keep this output substantially stable. In the arrangement shown in FIG. 2, the thermo-sensitive element 6 is a device having a negative temperature coefficient i.e. its resistance decreases with increase of temperature, and therefore as the unbalance electric current signal output of the bridge increases with temperature, the portion of that output which is passed through the amplifier 10 and relay 11 is decreased in a similar proportion.

A second embodiment of the invention is now to be described with reference to FIGS. 3 and 4. FIG. 3 shows a light source 42 and a lens system 43 disposed within, for example, a tube 44 which has a series of equi-spaced slots such as 45 through the wall thereof. The tube, hereinafter referred to as the chopper, is rotated about its axis so that a slot therethrough is disposed between the light source 42 and a photosensitive device such as a semiconductor photocell 46 each time a reading position in a data storage medium for example, a perforated tape 47 is likewise disposed therebetween. It will readily be understood therefore that with this arrangement, which although preferable it is not essential, that in the presence of a perforation in the tape, the light from source 42 is projected as a pulse with short rise and fall time toward the photocell 46 thus avoiding the gradual increase or decrease in the intensity of light reaching the photocell 46, as would obtain if the chopper 44 was dispensed with and the tape with a perforation therethrough was moved past the scanning position. The photocell 46 and thermo-sensitive element 48, are tightly thermally coupled in a metallic block 49 of good heat conducting material, for example, copper or brass which has been found to be satisfactory.

In this embodiment, and by way of example, the thermo-sensitive element 48 may be a semiconductor photocell, or another form of semiconductor junction device, or a thermally sensitive resistor, this thermo-sensitive element constituting a temperature sensitive means.

The electric current signal output from the photocell 46 is the input to a signal responsive means such as, for example, a three stage amplifier which is arranged to provide an output in response to the electric current signals generated by the photocell 46. The amplifier may comprise a class A stage, a class A or B stage, and a class C stage. A bias potential is applied to the class C stage, via the thermo-sensitive element 48, in such a manner that the effect of variation in temperature of the photocell 46 on the output therefrom to the amplifier is compensated for.

Referring to FIG. 4 which shows the circuitry of this embodiment, on each occasion when a perforation in a tape permits the light pulses generated by the source 42 and chopper 44 to reach photocell P, it passes an electric current signal increment to the base of transistor T1 of the amplifier, which in turn conducts more heavily. In consequence of the presence of resistance R1, each light pulse causes a positive excursion of the collector of transistor T1. This positive excursion is communicated via capacitor C1 to the base of the transistor T2, which therefore consequently momentarily conducts less heavily and whose collector makes a negative excursion on account of the presence of resistor R2. Transistor T3, whose collector circuit delivers output signals to load L, has its base connected to the junction of resistors R3 and transistor T4. The potential of the base of transistor T3 is determined jointly by the collector potential of transistor T2 and the potential drop across resistor R3. The value of resistors R4 and R5 are chosen so that the total current flowing into the base of transistor T4 via resistor R4 and thermo-sensitive element TSE is such that, when the ambient temperature is low, the potential of the base of transistor T3 is to a preferred degree positive with respect to its emitter. Transistor T3 is therefore cut off and no output signal current flows in output load L. When a light pulse reaches photocell P, the resultant negative excursion of the collector of transistor T2 causes the base of transistor T3 to be driven negative with respect to its emitter and current flows in output load L.

The preferred degree to which the base of transistor T3 is normally positive with respect to its emitter, is determined by the transparency or translucency of the material in which the code perforations are formed. Each time a light pulse emitted by the light source 42 falls on an unperforated part of the tape, some light penetrates the tape due to its translucency or transparency and reaches the photocell P which generates an electric current signal output, consequently, the collector of transistor T3 makes a small negative excursion as a result. It is desirable that this small excursion should just fail to render transistor T3 conducting and the values of resistors R4, R5 and R3 are chosen to secure this condition.

If the power supply voltage should rise, the light from source 42 gets brighter and the amplitude of the unwanted electric current signals caused by the lack of opacity of the tape increases. As, however, the potential of source S also increases, the current in resistor R5 and therefore in resistor R3 increases, and the base of transistor T3 is driven correspondingly more positive with respect to its emitter, and the unwanted electric current signals, although of larger amplitude are nevertheless suppressed.

When the ambient temperature increases, photocell P increases in sensitivity with two undesirable effects, namely, that the wanted electric current signals therefrom increase in power, and that the unwanted electric-current signals tend to render transistor T3 conducting. Both these effects are compensated for by the action of the thermo-sensitive element TSE which conducts more heavily at the higher temperature and causes transistor T4 to conduct more heavily. Consequently the potential across resistor R3 increases and the base of transistor T3 is biassed more heavily with respect to its emitter. By suitably choosing the value of resistor R3 the appropriate degree of influence of thermo-sensitive element TSE over the bias of transistor T3 may be secured. The negative potential to the bases and collectors of the transistors is applied at NP, a stabilised positive potential to the base and emitter of transistor T1 is applied at SPP via suitable resistors, an unstabilised positive potential is applied to the base and emitter of transistor T2 at UPP via suitable resistors; and a stabilised positive potential, constituting a variable bias is applied between VB and the emitter of transistors T4 via variable resistor RV1.

While the principles of the invention have been described above in connection with specific embodiments, and particular modifications thereof, it is to be clearly understood that the description is made only by way of example and not as a limitation on the scope of the invention.

What I claim is:

1. Apparatus for reading data from a storage medium comprising a light source, a photosensitive device for generating electric current signals in response to light received from said source by way of said storage medium, signal responsive means electrically connected to said photosensitive device for receiving outputs from said photosensitive device in accordance with said electric current signals generated thereby, and temperature sensitive means thermally coupled by a metallic block of high thermal conductivity to said photosensitive device and electrically connected to said signal responsive means in such a manner that the effect of variations in the temperature of said photosensitive means on the said outputs therefrom to said signal responsive means is compensated for, said temperature sensitive means and said photosensitive means being located within said block in close physical contact therewith.

2. Apparatus, as claimed in claim 1, in which the electrical connection between said temperature sensitive means and said signal responsive means comprises a bridge circuit with said temperature sensitive means in one arm of the bridge and said photosensitive means in the other arm of the bridge, whereby the effect of variations in the temperature of the said photosensitive device on the outputs therefrom to said signal responsive means is compensated for.

3. Apparatus, as claimed in claim 2 in which said temperature sensitive means comprises a semi-conductor junction device.

4. Apparatus, as claimed in claim 3, in which said semiconductor junction device is a photocell.

5. Apparatus, as claimed in claim 2 in which said temperature sensitive means comprises a thermally sensitive resistor.

6. Apparatus for reading data from a storage medium comprising a light source, a photosensitive device for generating electric current signals in response to light received from said source by way of said storage medium, signal responsive means electrically connected to said photosensitive device for receiving outputs from said photosensitive device in accordance with said electric current signals generated thereby, and temperature sensitive means thermally coupled to said photosensitive device and electrically connected to said signal responsive means in such a manner that the effect of variations in the temperature of said photosensitive device on the said outputs therefrom to said signal responsive means is compensated for, said temperature sensitive means and said photosensitive means being thermally coupled one to the other by a metallic member of high thermal conductivity within which they are located in close physical contact therewith, said temperature sensitive means comprising first and second thermo-sensitive elements, said photosensitive device and said first thermo-sensitive element being arranged respectively in the arms of a bridge circuit which is balanced in the absence of a perforation in said storage medium, and in which the said second thermo-sensitive element and a resistor in series therewith are connected in shunt to the output of said bridge circuit and in shunt to said signal responsive means and in such a manner that in the presence of data recorded on said storage medium the effective of variations in the temperature of said photosensitive device and said first thermo-sensitive element on the output therefrom to said signal responsive means is compensated for.

7. Apparatus, as claimed in claim 6 in which said first and second thermo-sensitive elements are semi-conductor junction devices.

8. Apparatus, as claimed in claim 7 in which said semiconductor junction devices are photocells.

9. Apparatus, as claimed in claim 6, in which said first thermo-sensitive element is a semiconductor junction device and said second thermo-sensitive element is a thermally sensitive resistor.

10. Apparatus, as claimed in claim 9, in which said semiconductor junction device is a photocell.

References Cited in the file of this patent

UNITED STATES PATENTS 2,909,669 Jacobs ---------------- Oct. 20, 1959